(12) United States Patent
Dugan et al.

(10) Patent No.: US 6,261,102 B1
(45) Date of Patent: *Jul. 17, 2001

(54) METHOD AND APPARATUS FOR TEACHING PROPER SWING TEMPO

(76) Inventors: Brian M. Dugan, 18 John St., Tarrytown, NY (US) 10591; Robert D. Grober, 6 Abigail St., Milford, CT (US) 06460

( * ) Notice: Subject to any disclaimer, the term of this patent is extended or adjusted under 35 U.S.C. 154(b) by 0 days.

This patent is subject to a terminal disclaimer.

(21) Appl. No.: 09/440,581

(22) Filed: Nov. 15, 1999

Related U.S. Application Data

(63) Continuation of application No. 08/858,824, filed on May 19, 1997, now Pat. No. 6,045,364.

(51) Int. Cl.[7] ..................................................... G06F 19/00

(52) U.S. Cl. ............................... 434/252; 482/3; 473/233

(58) Field of Search ........................... 482/1–9, 900–902; 434/247, 252; 340/870.01, 870.02, 870.13, 323 R; 473/213, 221, 223, 224, 234, 233

(56) References Cited

U.S. PATENT DOCUMENTS

| | | | |
|---|---|---|---|
| 3,717,857 | * 2/1973 | Evans | 340/870.13 |
| 3,788,647 | 1/1974 | Evans . | |
| 3,815,427 | 6/1974 | Gladstone . | |
| 5,056,783 | 10/1991 | Matcovich et al. . | |
| 5,174,577 | 12/1992 | Warde et al. . | |
| 5,233,544 | 8/1993 | Kobayashi . | |
| 5,257,084 | 10/1993 | Marsh . | |
| 5,688,183 | 11/1997 | Sabatino et al. . | |
| 5,694,340 | * 12/1997 | Kim | 434/252 |
| 5,741,182 | * 4/1998 | Lipps et al. | 463/36 |

* cited by examiner

Primary Examiner—Glenn E. Richman

(57) ABSTRACT

A swing tempo training device is provided which may be used to teach proper swing tempo. The disclosed swing tempo training device comprises an accelerometer coupled to a voltage-to-frequency converter, and an output means coupled to the voltage-to-frequency converter. The accelerometer measures the real-time acceleration of a swinging object and produces a first voltage signal with a voltage level related to the measured real-time acceleration. The voltage-to-frequency converter then converters the first voltage signal into a second voltage signal with a frequency related to the first voltage level. The output means then outputs the second voltage signal. Preferably the output means comprises a frequency modulator and a FM transmitter.

20 Claims, 2 Drawing Sheets

METHOD AND APPARATUS FOR TEACHING PROPER SWING TEMPO

This application is a continuation of U.S. patent application Ser. No. 08/858,824, filed May 19, 1997, U.S. Pat. No. 6,045,364 titled "METHOD AND APPARATUS FOR TEACHING PROPER SWING TEMPO".

BACKGROUND OF THE INVENTION

The present invention relates to an improved method and apparatus for teaching proper swing tempo. Specifically, acceleration information is used as an aid to swing tempo training. Examples of activities which may benefit from this method and apparatus include sporting activities such as golf, baseball, hockey, and tennis, and non-sporting activities such as swinging a hammer or an ax.

A difficult challenge in swing intensive sporting activities (e.g., golf or tennis) is to perfect a swing and repeat it consistently. The pace of a swing, also known as swing tempo, is an important factor in most swing intensive activities as proper swing tempo is indicative of proper body position and proper body motion. In golf, for example, proper golf swing tempo ensures that golf club head velocity and golf club head position are optimized during a golf swing. As such, a device which assists a golfer in consistently repeating proper swing tempo can be an invaluable teaching aid.

To be effective, a swing tempo training device must provide "real-time" feedback (i.e., sufficiently instantaneous and continuous to allow modification of a swing during the swing).

Real-time feedback provides real-time information which allows a person to know during a swing whether swing tempo should be increased, decreased, or maintained.

While a number of swing tempo training devices exist, most fail to provide real-time swing tempo information (making adjustments during a swing impossible). U.S. Pat. No. 5,257,084 (hereinafter "the '084 patent"), for example, discloses a golf swing training device which measures swing tempo by using two parallel infrared transmitters and receivers located in a tee area. By measuring the time between two successive breaks in the path of transmitted infrared beams of light, an average backswing tempo and an average velocity through the tee area can be derived. The '084 apparatus provides swing tempo information only after the golf swing has been completed. Additionally, swing tempo information is not real-time; only average club speed and average swing tempo can be measured. As such, a golfer using the '084 device is unable to adjust swing tempo during a swing. Further, the system is not readily adaptable to applications where the object being struck is moving (as is the case in many non-golf applications).

Another example of a conventional swing tempo training device is U.S. Pat. No. 5,174,577 (hereinafter "the '577 patent") The '577 patent discloses a swing training device which provides an audible sound representative of the velocity of a golf club during a golf swing. A pair of tensioned vibrational members placed on a golf club vibrate during a golf swing, producing an audible sound with a volume proportional to the velocity of the golf club. Only one sound is produced by the vibrating members, the volume of which is proportional to the club's velocity. This feature makes it impossible to control the device's volume (as a courtesy to other golfers) without changing swing tempo and makes small differences in swing tempo indistinguishable in a noisy environment. As well, the '577 device causes a golf club to vibrate in a manner many golfers may find annoying or distracting.

A need therefore exists for a swing tempo training device which provides real-time feedback that does not disturb others and which does not create artificial vibrations during a swing.

Accordingly, it is an object of the present invention to provide a device which overcomes the short comings of conventional swing training devices and provides a highly effective swing tempo training device which can be used both on an off a playing field, work area, or the like.

First, it is an object of the invention to provide real-time feedback during an entire swing. Such feedback allows a user to recognize and correct improper swing tempo during a swing. Because improper swing tempo is indicative of improper body motion, real-time swing tempo information provides real-time body motion information (i. e., biofeedback).

Another object of the invention is to provide a device which allows swing tempo information to be easily recorded, replayed, and mimicked. For instance, the swing tempo of a professional can be recorded and replayed so that students can learn the professional's swing tempo.

Yet another object of the invention is to provide feedback which allows small changes in velocity of a swinging object to be detected (even in noisy environments) and which does not disturb other participants.

Still another object of the invention is to provide a small-sized swing tempo training device which provides no significant alteration to the aerodynamic properties of a swinging object, which does not induce vibrations during a swing, and which is inexpensive and reliable.

SUMMARY OF THE INVENTION

These and other objects of the invention are accomplished in accordance with the principles of the invention by providing a swing tempo training device which provides real-time swing tempo information.

The swing tempo training device of the present invention comprises an accelerometer coupled to a voltage-to-frequency converter, and an output means coupled to the voltage-to-frequency converter. The accelerometer measures the real-time centripetal acceleration of a swinging object (centripetal acceleration being related to the square of the velocity of the swinging object) and produces a voltage signal with a voltage level proportional to the measured acceleration. As the measured acceleration varies, so does the voltage level of the voltage signal produced by the accelerometer. In response to the voltage signal produced by the accelerometer, the voltage-to-frequency converter produces an audio signal with a frequency (and amplitude) proportional to the voltage signal from the accelerometer. Just as the voltage signal varies as measured acceleration varies, the frequency of the audio signal produced by the voltage-to-frequency converter varies as the voltage level of the voltage signal varies. In this manner, a different audio frequency is produced for each different acceleration value measured by the accelerometer.

The audio signal produced by the voltage-to-frequency converter is passed to the output means which may comprise an amplifier and a speaker. In a preferred embodiment, the output means comprises a Frequency Modulation (hereinafter "FM") or Amplitude Modulation (hereinafter "AM") transmitter (e.g., an electromagnetic transmitter) which produces a FM or an AM signal from the audio signal and transmits this modulated signal in either the MHz or kHz frequency range. This particular output means allows the audio signal to be received, demodulated, played, and recorded with a standard AM/FM receiver/cassette recorder. A highly desirable feature of this embodiment is that a user may record and replay a proper swing tempo numerous times thereby memorizing the sound created during a proper swing.

When using the swing tempo training device of the present invention during a swing, a user will hear sounds representative of the real-time velocity of the swinging object. If at a given instant the velocity of the swinging object differs from the desired velocity, the user will immediately recognize a difference in audio frequency (e.g., a difference in tone). This allows the user to identify what portion of the swing is improper, thereby allowing the user not only to concentrate on correcting that portion of the swing during subsequent swings but also allowing corrections during a swing. As well, numerous swing tempos may be recorded (such as for long or short distance swings) and the swing tempo of a professional (which a novice may emulate) may be recorded.

Further features of the invention, its nature and various advantages will be more apparent from the accompanying drawing and the following detailed description of the preferred embodiments.

DETAILED DESCRIPTION OF THE PREFERRED EMBODIMENT

Figure 1:
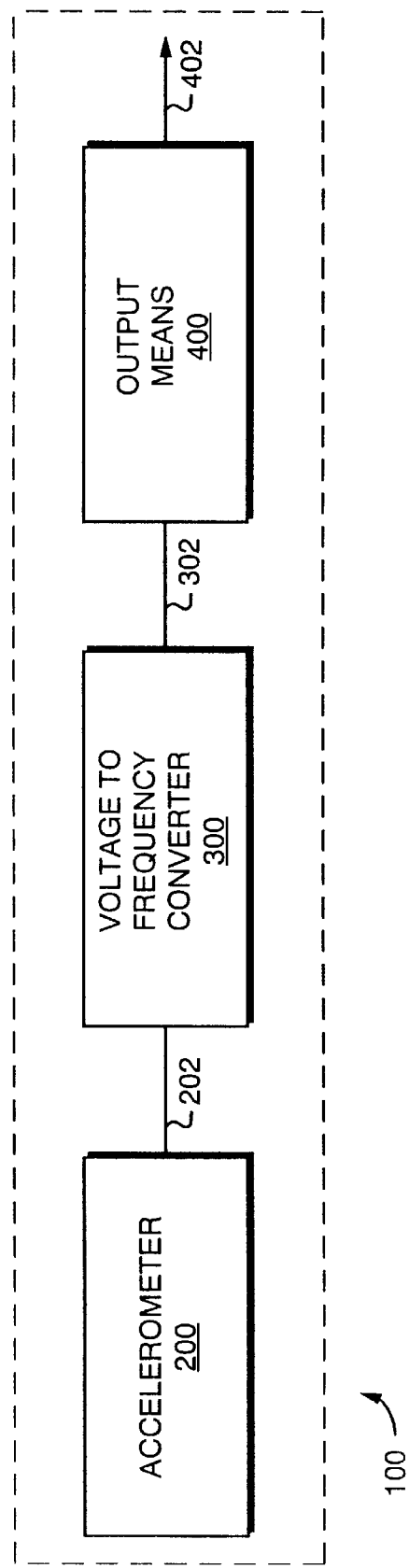
FIG. 1 is a block diagram of the main components of an illustrative swing tempo training device made in accordance with this invention.

In the illustrative embodiment shown in FIG. 1 a swing tempo training device 100 comprises an accelerometer 200 with a voltage signal output 202, a voltage-to-frequency converter 300 operatively coupled to accelerometer 200 which produces an audio signal 302 in response to voltage signal 202, and an output means 400 operatively coupled to voltage-to-frequency converter 300 which produces an output signal 402 in response to audio signal 302.

As a result of a swinging object traveling in a circular path, a centripetal acceleration component is generated along a length of the swinging object. For example, during the swinging 6 of a golf club, a centripetal acceleration component is produced in a direction parallel to the golf club shaft. This centripetal acceleration is related to the square of the velocity of the swinging object (e.g., the square of the velocity of a head of a golf club). A measure of centripetal acceleration is therefore an indirect measure of a swinging object's velocity. Accelerometer 200 is a linear accelerometer configured to measure this centripetal acceleration component, and as such a representation of the velocity of a swinging object to which it is attached. Such accelerometers are well known in the art and may comprise, for example, the accelerometers used to trigger the deployment of airbags in automobiles. Accelerometer 200 measures real-time centripetal acceleration, producing voltage signal 202 at its output. Voltage signal 202 has a voltage level proportional to the acceleration measured by accelerometer 200, and as such has a voltage level which varies as the real-time acceleration measured by accelerometer 200 varies.

Voltage-to-frequency converter 300 inputs voltage signal 202 and produces audio frequencies which are proportional to the voltage levels of voltage signal 202. These audio frequencies are output from voltage-to-frequency converter 300 in the form of an audio signal, audio signal 302. Voltage-to-frequency converter 300 may comprise any voltage-to-frequency converter known in the art but in a preferred embodiment comprises a voltage-controlled oscillator as described below.

Audio signal 302 is input by output means 400 which alters audio signal 302 to form output signal 402. Output signal 402 may simply be an amplified version of audio signal 302 which is fed to a speaker (not shown). In such an embodiment, a user hears audio tones representative of the velocity of the swinging object, the audio tones varying as the velocity of the swinging object varies. In a preferred embodiment, however, output signal 402 comprises a modulated version of audio signal 302 which is transmitted from output means 400 for remote reception as further described below.

Figure 2:
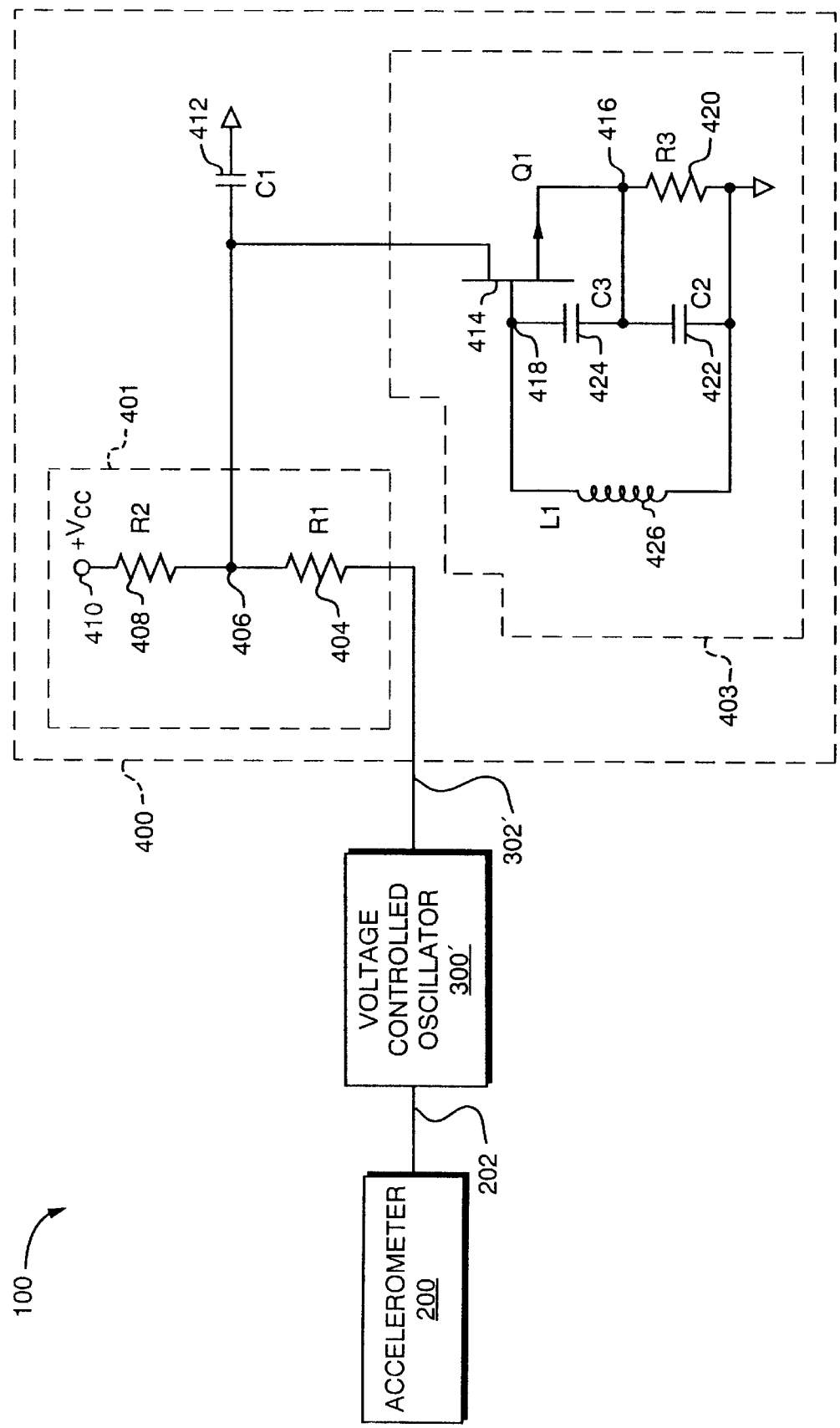
FIG. 2 is a circuit diagram of an illustrative swing tempo training device made in accordance with this invention.

FIG. 2 shows a preferred embodiment for swing tempo training device 100. As seen in FIG. 2, swing tempo training device 100 comprises an accelerometer 200 for producing a voltage signal 202 coupled to a voltage-controlled oscillator 300' for producing an audio signal 302' in response to voltage signal 202, and an output means 400 operatively coupled to voltage controlled oscillator 300'.

As previously described, accelerometer 200 measures the real-time centripetal acceleration of a swinging object and produces a voltage signal 202 with a voltage level proportional to the measured acceleration. That is, the voltage level of voltage signal 202 varies as the centripetal acceleration measured by accelerometer 200 varies.

Voltage-controlled oscillator 300' inputs voltage signal 202 and produces audio frequencies which are proportional to the voltage levels of voltage signal 202. These output frequencies are output from voltage-controlled oscillator 300' in the form of audio signal 302'. Voltage-controlled oscillators are well known in the art and in a preferred embodiment the voltage-controlled oscillator of a phase-locked loop is used as voltage controlled oscillator 300' (such as National Semiconductor's CD4046).

Audio signal 302' is input by output means 400' which in a preferred embodiment comprises a high frequency oscillator circuit which is modulated by audio signal 302'. In the preferred embodiment depicted in FIG. 2, a voltage divider circuit 401 uses audio signal 302', to modulate a colpitt oscillator circuit 403 resulting in the frequency modulation and transmission of audio signal 302'. Audio signal 302' may then be received, played, and recorded by a FM receiver/cassette recorder (not shown). It is understood that audio signal 302' may be modulated and or transmitted using any modulation scheme and/or transmission frequency including cellular telephony or optical transmission.

Referring to output means 400 of FIG. 4, voltage divider 401 is formed from a first resistor 404 coupled between voltage controlled oscillator 300' and a first node 406, and a second resistor 408 coupled between first node 406 and a voltage source 410. Coupled to voltage divider 401 is a first capacitor 412 coupled between first node 406 and ground (e.g., 0 volts, though other voltage values may be used). Also coupled to voltage divider 401 is a colpitt oscillator circuit 403 comprising a transistor 414 with a source coupled to first node 406, a drain coupled to a second node 416, and a gate coupled to a third node 418, a third resistor 420 and a second capacitor 422 coupled between second node 416 and ground, a third capacitor 424 coupled between second node 416 and third node 418, and an inductor 426 coupled between third node 418 and ground.

In operation, first resistor 404 and second resistor 408 form a voltage divider circuit with respect to first node 406. That is, the voltage level at first node 406 ($V_{406}$) is approximately given by the expression:

$$V_{406} = \frac{V_{410} R_{404} - V_{302'} R_{408}}{R_{404} + R_{408}}$$

Therefore, when audio signal 302' has a low voltage level, the voltage level at first node 406 is large and when audio signal 302' has a high voltage level, the voltage level at first node 406 is small. The voltage level at first node 406 thereby inversely tracks the voltage level of audio signal 302' from voltage controlled oscillator 300', with any high frequency noise components present at first node 406 being shunted to ground via first capacitor 412.

The voltage level at first node 406 is coupled to a colpitt oscillator 403 via the source of transistor 414. The voltage level at first node 406 modulates the current flowing through transistor 414 and thus third resistor 420 via second node 416. When the voltage level at first node 406 is large (i.e., when the voltage level of audio signal 302' is small), the current passing through transistor 414 is large and the voltage across first resistor 420 is large; otherwise, when the voltage level at first node 406 is small (i.e., when voltage level of audio signal 302' is large), the current passing through transistor 414 is small and the voltage level across first resistor 420 is small. In this manner, the voltage level at second node 416 is amplitude modulated by audio signal 302'. In addition to being amplitude modulated by audio signal 302', the voltage level at second node 416 is also frequency modulated by audio signal 302' as a result of non-linearities inherent in transistor 414. Thus, the voltage level at second node 416 is both amplitude and frequency modulated by audio signal 302'.

Inductor 426, second capacitor 422, and third capacitor 424 determine the fundamental frequency at which colpitt oscillator 403 oscillates. Assuming second capacitor 422 and third capacitor 424 have the same capacitance value C and inductor 426 has an inductance value of L, the fundamental frequency at which oscillator 403 oscillates ($f_o$) is given by the expression:

$$f_0 = \frac{1}{2\pi} \sqrt{\frac{2}{LC}}$$

In a preferred embodiment $f_o$ is selected to be approximately 80 Mhz. However, because audio signal 302' amplitude and frequency modulates the voltage level at second node 416, colpitt oscillator 403 actually comprises a superposition of an 80 Mhz center frequency which is both amplitude and frequency modulated by audio signal 302'. That is, the modulation of colpitt oscillator circuit 403 by audio signal 302' results in the generation of an amplitude and frequency modulated version of audio signal 302' centered around 80 Mhz. This amplitude and frequency modulated version of audio signal 302' is transmitted (electromagnetic radiation containing audio signal 302' information is emitted) from the wire connecting first node 406 and the source of transistor 414. Therefore, output means 400 produces an amplitude and frequency modulated version of audio signal 302' which is centered around 80 Mhz and transmitted via the wire connecting first node 406 and the source of transistor 414. This transmitted signal may be received by tuning a FM receiver to 80 Mhz.

In this manner, in a preferred embodiment, a person using the swing tempo training device of the present invention attaches swing tempo training device 100 to an object to be swung and tunes a FM radio receiver to approximately 80 Mhz. By swinging the object, audio frequencies will be heard from the FM radio receiver representative of the real-time velocity of the swinging object. These audio frequencies may be recorded and replayed, allowing a user to mimic an earlier recorded, proper swing tempo.

The foregoing description discloses only the preferred embodiment of the present invention, modifications of the above disclosed apparatus and method which fall within the scope of the invention will be readily apparent to those skilled in the art. Specific components may be substituted with equivalent components and the number of components may be increased or reduced and still remain within the scope of the present invention. The swing tempo apparatus may be employed for teaching proper putting tempo or proper swing tempo for a tennis racket, baseball bat or hockey stick, to teach proper casting during fly fishing, proper tempo during bowling, and to monitor the velocity of a baseball player's throwing arm. Further, a boxer or martial artist can use the apparatus to monitor the velocity and acceleration (and thus the force) of punches or kicks. Additionally, any modulation and transmission scheme may be used for transmitting audio frequencies to remote locations.

While the present invention has been disclosed in connection with the preferred embodiment thereof, it should be understood that there may be other embodiments which fall within the spirit and scope of the invention as defined by the following claims:

What is claimed is:

1. An apparatus adapted to monitor swing tempo comprising:

an accelerometer, said accelerometer adapted to measure a real-time acceleration of a swinging object and to produce a first voltage signal with a voltage level related to said real-time acceleration;

a voltage-to-frequency converter coupled to said accelerometer, said voltage-to-frequency converter adapted to convert said first voltage signal into a second voltage signal having an audio frequency related to said voltage level; and an output device coupled to said voltage-to-frequency converter and adapted to output said second voltage signal.

2. The apparatus defined in claim 1 wherein said accelerometer measures a centripetal acceleration of said swinging object.

3. The apparatus defined in claim 1 wherein said accelerometer measures a linear acceleration of said swinging object.

4. The apparatus defined in claim 1 wherein said output device comprises:

an amplifier, said amplifier adapted to amplify said second voltage signal to produce an amplified second voltage signal; and a speaker coupled to said amplifier, said speaker adapted to output said amplified second voltage signal.

5. The apparatus defined in claim 1 wherein said apparatus is mounted on said swinging object.

6. The apparatus defined in claim 1 wherein said apparatus is mounted inside said swinging object.

7. The apparatus defined in claim 1 wherein said output device comprises:

a modulator, said modulator adapted to modulate said second voltage signal to produce a modulated second voltage signal; and a transmitter coupled to said modulator, said transmitter adapted to transmit said modulated second voltage signal.

8. The apparatus defined in claim 7 wherein said transmitter uses said swinging object as an antenna.

9. The apparatus defined in claim 7 wherein said modulator is a frequency modulator.

10. The apparatus defined in claim 7 wherein said transmitter is a FM transmitter.

11. A method of teaching proper swing tempo comprising the steps of:

measuring a real-time acceleration of a swinging object;

producing a first voltage signal with a voltage level related to said real-time acceleration;

converting said first voltage signal into a second voltage signal having an audio frequency related to said voltage level; and outputting said second voltage signal.

12. The method defined in claim 11 wherein said acceleration is centripetal acceleration.

13. The method defined in claim 11 wherein said acceleration is linear acceleration.

14. The method defined in claim 11 wherein said outputting step further comprises:

amplifying said second voltage signal to produce an amplified second voltage signal; and outputting said amplified second voltage signal to a speaker.

15. The method defined in claim 11 wherein said outputting step further comprises:

modulating said second voltage signal to produce a modulated second voltage signal; and transmitting said modulated second voltage signal.

16. The method defined in claim 15 wherein said transmitting step comprises:

transmitting said modulated second voltage signal by using said swinging object as an antenna.

17. The method defined in claim 15 wherein said modulating step comprises:

frequency modulating said second voltage signal.

18. An apparatus adapted to monitor swing tempo comprising:

an accelerometer adapted to measure an acceleration of a swinging object and to produce in real time a first voltage signal with a voltage level related to the measured acceleration; and an audio frequency generation circuit coupled to the accelerometer and adapted to generate and output in real time an audio frequency that depends on the voltage level of the first voltage signal.

19. The apparatus of claim 18 wherein the audio frequency generation circuit comprises:

a voltage-to-frequency converter coupled to the accelerometer and adapted to convert in real time the first voltage signal into a second voltage signal having an audio frequency related to the voltage level of the first voltage signal; and an output device coupled to the voltage-to-frequency converter and adapted to output in real time the second voltage level.

20. The apparatus of claim 19 wherein the accelerometer is adapted to measure a linear acceleration.

* * * * *